United States Patent [19]

Liska et al.

[11] 4,167,693

[45] Sep. 11, 1979

[54] CONTROL ARRANGEMENT FOR A BRUSHLESS D-C MOTOR

[75] Inventors: Manfred Liska, Nüremberg; Hans Kühnlein, Nüremberg-Grossgrundlach; Georg Kögler, Schwabach; Karl Schalk, Nüremberg, all of Fed. Rep. of Germany

[73] Assignee: Siemens Aktiengesellschaft, Munich, Fed. Rep. of Germany

[21] Appl. No.: 862,425

[22] Filed: Dec. 20, 1977

[30] Foreign Application Priority Data

Dec. 22, 1976 [DE] Fed. Rep. of Germany ....... 2658321

[51] Int. Cl.² ........................................... H02K 29/00
[52] U.S. Cl. ..................................... 318/138; 18/432
[58] Field of Search .............. 318/138, 254, 685, 696, 318/432

[56] References Cited

U.S. PATENT DOCUMENTS

| 3,732,472 | 5/1973 | Favre | 318/696 X |
| 3,812,413 | 5/1974 | Keidl | 318/696 |
| 3,824,440 | 7/1974 | McIntosh | 318/696 |
| 4,035,708 | 7/1977 | Schaff | 318/696 |
| 4,047,081 | 9/1977 | Liska | 318/696 |

Primary Examiner—Gene Z. Rubinson
Attorney, Agent, or Firm—Kenyon & Kenyon

[57] ABSTRACT

A commutation device for controlling a brushless d-c motor is disclosed. The commutation device includes a regulator circuit for regulating current supplied to the motor by means of a transistor connected between the power source and a commutation circuit. A threshold hysteresis level detector controls the transistor. During current peaks generated in the commutation circuit, the hysteresis of the level detector is increased to provide stable operation of the regulator with different motors and operating voltages.

19 Claims, 11 Drawing Figures

CONTROL ARRANGEMENT FOR A BRUSHLESS D-C MOTOR

BACKGROUND OF THE INVENTION

The present invention relates to a commutation device for a brushless d-c motor and more particularly to a commutation device which provides regulated current to the stator windings as a function of rotor position by means of a regulator circuit.

Brushless d-c motors may be controlled by a commutation device which includes a transistorized bridge circuit for connecting the d-c voltage source to the stator windings as a function of rotor position. Use of a transistorized bridge circuit allows current to be supplied to the windings in both directions so that operation of the motor in two directions is possible. Brushless d-c motors of this type may advantageously be used as stepping motors, and operating such motors at constant current provides additional advantages.

In commutation devices which include a regulator circuit to provide constant current to the bridge circuit, a control element such as a main control transistor is provided as the output of the regulator circuit and is connected between the voltage source and the bridge circuit. The regulator circuit may include a comparison element such as a level detector to which are supplied the sampled and reference values of current and which controls operation of the main transistor, there being a hysteresis involved with switching the main transistor off and on. Where large currents are supplied to the motor, Darlington-connected transistors are used in the bridge circuit for commutation instead of simple transistors since they provide a large output current. However, the capacitances of Darlington-connected transistors add up and when such transistors are used in the commutation device, a charge reversal in the transistor capacitances occurs each time the main control transistor is driven into conduction. Brief current peaks due to the respective cut-off transistors of the bridge circuit are generated superimposed on the current supplied to the motor. These peaks can impair the function of the level detector of the regulator circuit if the magnitude of the current peaks at the level detector inputs is higher than the level set for the level detector. In such a case, operation of the level detector and regulator circuit are unstable. The current peaks may be suppressed at least partially by smoothing (filtering), particularly if transistors are used. However, the current hysteresis depends on the motor operating voltage and time constant. Therefore, operation of the regulator circuit and level detector is not stable for different motor voltages and motor types and such commutation devices cannot, per se, be used for different motors and voltages.

SUMMARY OF THE INVENTION

It is an object of the present invention to provide an improved commutation device of the type described for a brushless d-c motor.

It is a further object of the present invention to provide an improved regulator circuit for the commutation device of the type described which operates stably with different motors and at different motor voltages.

These and other objects of the present invention are achieved by a regulator circuit for a commutation device of the type described which includes a threshold hysteresis level detector in which the threshold hysteresis of the level detector is increased for the duration of current peaks generated by switching transistors in the commutation device.

According to one aspect of the invention, at least one of the threshold levels is changed to increase the hysteresis during the current peaks. According to another aspect of the invention, the signal corresponding to the motor current that is fed to the level detector is changed to increase the hysteresis of the level detector during the current peaks.

In one embodiment of the invention, the voltage change at the collector of the main control transistor when it is switched on is differentiated by an R-C circuit and fed to the level detector to increase the hysteresis thereof during the current peaks. In other embodiments, the output of the level detector is used to trigger a time delay stage which provides a signal to the level detector to increase the hysteresis thereof during the current peaks. In still another embodiment, the output of a drive stage connected to the output of the level detector is fed back to the level detector through a capacitor to increase the hysteresis of the level detector during the current peaks.

These and other aspects of the invention will be more apparent from the following description of the preferred embodiments thereof when considered with the accompanying drawings.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENTS

Figures 1, 2, 3:
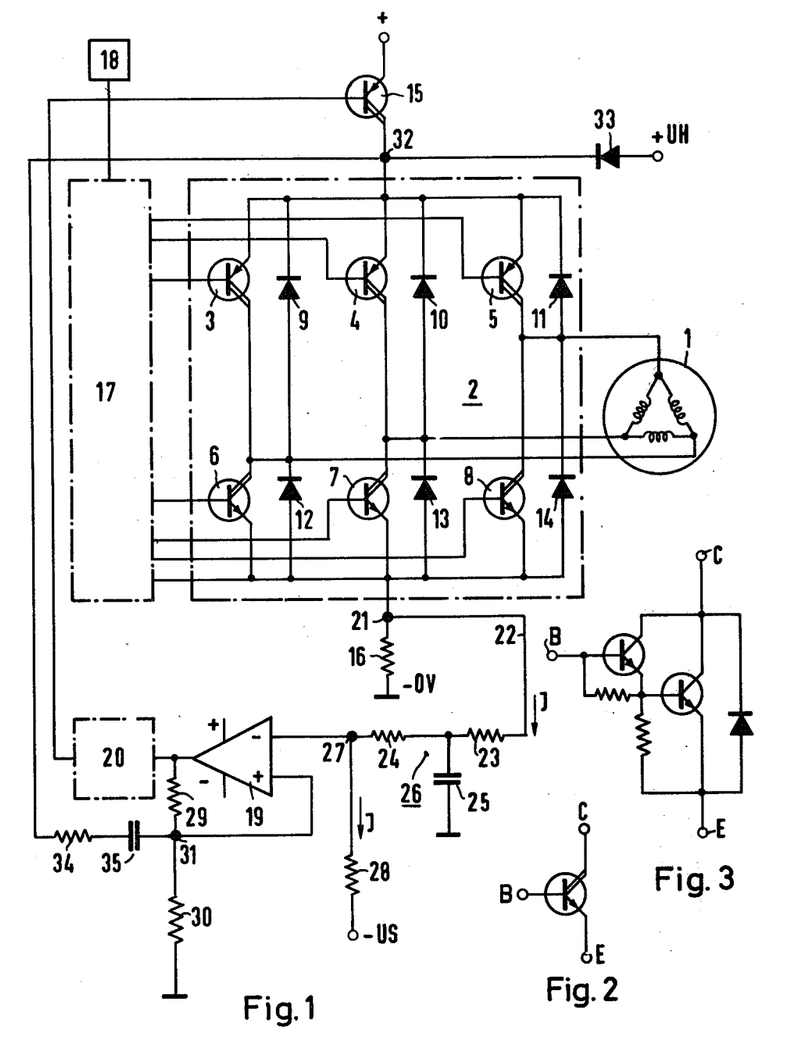
FIG. 1 is a schematic circuit diagram showing a commutation device for controlling a brushless d-c motor according to the present invention which includes a regulator circuit having a threshold hysteresis level detector and means for increasing the hysteresis thereof according to the invention.
FIG. 2 shows the symbol for transistors connected in a Darlington arrangement.
FIG. 3 is a schematic circuit diagram showing two transistors connected in a Darlington arrangement.

Referring first to FIG. 1, stepping motor 1 has three delta-connected stator phase windings, the ends of the windings being connected to a commutation device 2. The commutation device 2 comprises Darlington-connected transistors 3-8 arranged in a bridge circuit, the transistors 3-5 forming the one half of the bridge and the transistors 6-8 forming the other half of the bridge. Diodes 9-14 are connected in parallel across transistors 3 to 8 with the polarity of each diode being opposite to that of a respective transistor, as shown in FIG. 1. One input of the commutation device 2 is connected to the plus terminal of a d-c voltage source +UM by main Darlington-connected control transistors 15 and the other input of the commutation device is connected to the minus terminal −OV of the d-c voltage source via a resistor 16. In FIG. 2, the symbol for Darlington-connected transistors is shown and in FIG. 3, the manner in which the individual transistors are inter-connected is shown.

The bases of the transistors 3-8 in FIG. 1 are connected to a control circuit 17 which operates to turn the transistors on and off according to the position of the rotor sensed by rotor position pick-ups. Transistors 3-8 are therefore driven into conduction and are cut off by the control circuit 17 in a sequence corresponding to the position of the rotor. In the embodiment shown in FIG. 1, a clock generator 18 is connected to the control circuit to provide pulses for the stepwise control of the motor 1. Current to the motor is regulated to be constant by a regulator circuit which includes a threshold hysteresis level detector or bang-bang circuit 19, drive stage 20 and control transistors 15. The output of level detector 19 is connected via the drive stage 20 to the base (terminal B) of the Darlington-connected control transistors 15 which also operate as the output stage for the regulator circuit. Resistor 16 is provided so that the instantaneous current to the motor may be sampled, the current ($J_{ist}$) (sampled motor current) through resistor 16 being proportional to the current to the motor. The voltage (sampled motor voltage) at terminal 21 is proportional to the current through resistor 16 (and therefore proportional to the motor current), and is fed via line 22 and a smoothing filter stage 26 consisting of resistors 23 and 24 and capacitor 25 to a point 27 connected to the negative or inverting input of level detector 19. Also connected to point 27 via resistor 28 is the negative pole of the supply voltage −US. Resistor 28 and the negative supply voltage provide a predetermined reference or set voltage at point 27. The voltage difference at point 27 between the reference voltage and the sampled motor voltage from terminal 21 filtered by the filter stage 26 is fed to the inverting input of level detector 19. A voltage divider consisting of resistors 29 and 30 is connected to the output of level detector 19 and provides the two thresholds for the dual threshold level detector 19. The junction point 31 between resistors 29 and 30 is connected to the positive or non-inverting input of level detector 19.

A positive holding voltage +UH is applied via bypass diode 33 to point 32 between the control transistors 15 and the bridge circuit of commutation device 2 to maintain voltage at the motor windings when the control transistors 15 are cut off so that the rotor retains its instantaneous position (holding moment).

The three phase windings of the motor 1 are cyclically energized by transistors 3-8 of commutation device 2 to generate a rotating field. The operation of motors such as motor 1 is known in the art and further description is not deemed necessary for purposes of the invention.

Figure 4:
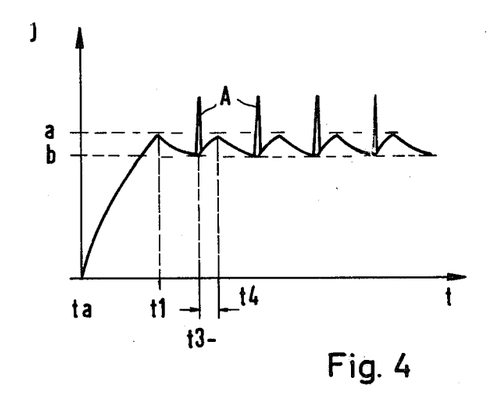
FIG. 4 is a graph showing the waveform vs. time of the current supplied to the motor as sampled through a sampling resistor common to the windings of the motor.

The waveshape of the sampled motor current (sampled through resistor 16), which is regulated to a constant value by means of a regulator circuit including the threshold hysteresis level detector 19, is shown in FIG. 4 in which the instantaneous value of the sampled motor current is plotted versus time. The upper threshold limit for the level detector which corresponds to a value of sampled motor current is designated "a" and the lower threshold limit is designated "b." These limits are set by the value of resistors 29 and 30. The difference $a-b$ is the hysteresis of the dual threshold level detector 19.

At time ta the operating voltage +UM of the motor is applied to the commutation device 2 by means of the control transistors 15 and the current supplied to the motor (and sampled motor current) increases until time t1 when the sampled motor current reaches the threshold value a set by the value of resistors 29 and 30. At threshold a, the level detector 19 switches transistors 15 off and the current supplied to the motor decreases until time t3 when the sampled motor current drops to the lower threshold b, a predetermined value set by the holding voltage +UH and the resistor 30. At threshold b, control transistors 15 are switched on. When transistors 15 are switched on into the conducting state, a considerably higher motor operating voltage +UM appears at point 32 at the input to the commutation device 2. This voltage change causes a reversal of the charges of the capacities of the transistors 3-8, which are particularly large with the Darlington-connected transistors. This charge reversal causes brief current peaks, designated A in the sampled motor current, which act to cut off the transistors in the bridge circuit of the commutation device 2. These current peaks are superimposed on the sampled motor current taken through resistor 16 and affect the operation of the level detector 19 when the current peaks are higher than the upper threshold a to which the level detector 19 is set. The current peaks are suppressed to a certain degree by smoothing filter stage 26. However, the magnitude and direction of the current peaks and the current hysteresis depends on the operating voltage +UM of the motor and motor time constant. Therefore, the circuit described thus far and illustrated in FIG. 1 cannot be used for different operating voltages and motor types.

The level detector operates stably only if the set threshold values a, b of the level detector 19 provide a threshold hysteresis which is not exceeded by the brief current peaks A. According to the invention, this is achieved by increasing the threshold hysteresis of the dual level detector 19 for the short time when control transistors 15 are switched on. According to one embodiment of the invention shown in FIG. 1, this is accomplished by connecting point 32 between control transistors 15 and the bridge circuit of the commutation device 2 to point 31 via an R-C series circuit consisting of a resistor 34 and capacitor 35. This connection provides positive feedback of the voltage change at the collector of the transistors 15 to the non-inverting input of level detector 19, the voltage change being differentiated by the R-C series circuit and superimposed on the existing positive feedback provided by resistors 29 and 30. The time constant of the R-C series circuit is selected to correspond to the pulse width of the current peaks A.

Figure 5:
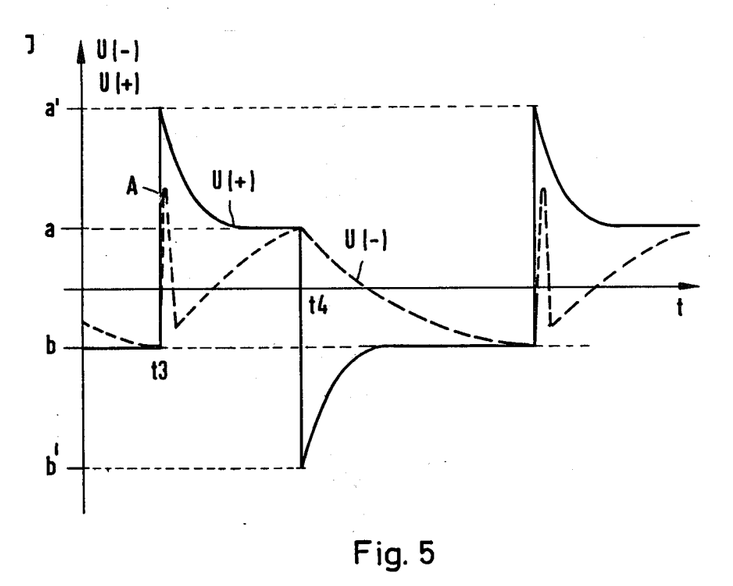
FIG. 5 is a graph showing the waveforms vs. time of the signals present at the inputs of the threshold hysteresis level detector of FIG. 1.

FIG. 5 shows the signals U(+), U(−) present at the inputs of level detector 19 as a function of time. The signal U(−) at the inverting input is shown by dashed lines and the signal U(+) at the non-inverting input is shown by solid lines. The current peaks A at the inverting input are made ineffective by the simultaneous increase of the switching threshold from a to a' at the non-inverting input. The current peaks A do not exceed the upper threshold (now a') of the level detector and remain within the hysteresis (now a'−b'), thereby preventing instability of the level detector 19 by the current peaks. The lower threshold b is correspondingly reduced to b' when the voltage to the R-C series circuit 34, 35 is switched off by control transistors 15. This change in the lower threshold is of no consequence and does not affect operation of the commutation device 2.

Figure 6:
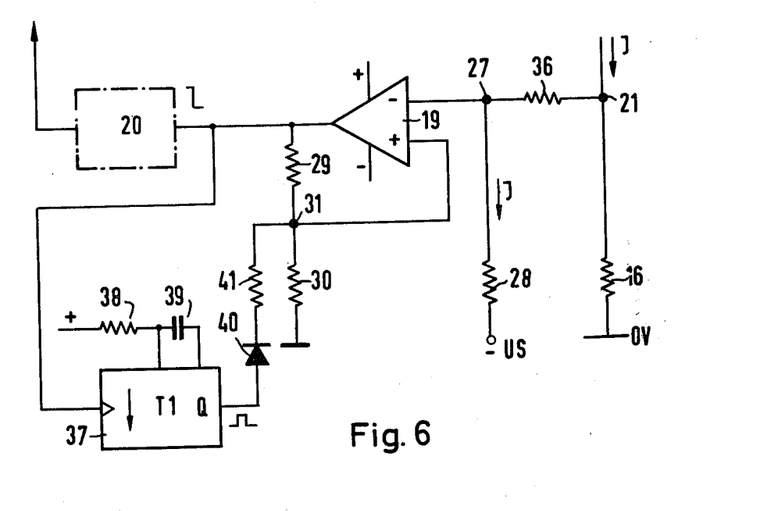
FIG. 6 is a schematic circuit diagram showing another embodiment of means according to the invention for increasing the hysteresis of the threshold hysteresis level detector.

In FIG. 6 is shown another embodiment of the regulator circuit portion of the circuit shown in FIG. 1. The motor current is again sampled through resistor 16 and the sampled motor voltage at point 21 is fed via resistor 36 to the comparison point 27. The resistor 28 and the negative supply voltage −US provide a reference voltage at point 27 as in FIG. 1. The difference between the reference voltage and the sampled motor voltage is fed to the inverting input of level detector 19. The output of level detector 19 is connected via a drive stage 20 to the base of control transistors 15 acting as the output stage as in FIG. 1. As shown in FIG. 6, a time delay stage 37 is provided to increase the hysteresis of level detector 19 during the current peaks A. The delay of the time delay stage 37 is predetermined by selection of the values of resistor 38 and capacitor 39. The output, Q, of the time delay stage 37 is connected via a diode 40 and a resistor 41 to the junction point 31 between resistors 29 and 30, this junction being connected, as in FIG. 1, to the non-inverting input of level detector 19. The output signal of level detector 19 at time t3 triggers the time delay stage 37, which, during its delay time T1, supplies an additional positive feedback current into resistor 30 via resistor 41 and diode 40. The potential at point 31 is thus increased during T1, thereby increasing the hysteresis of level detector 19.

Figure 7:
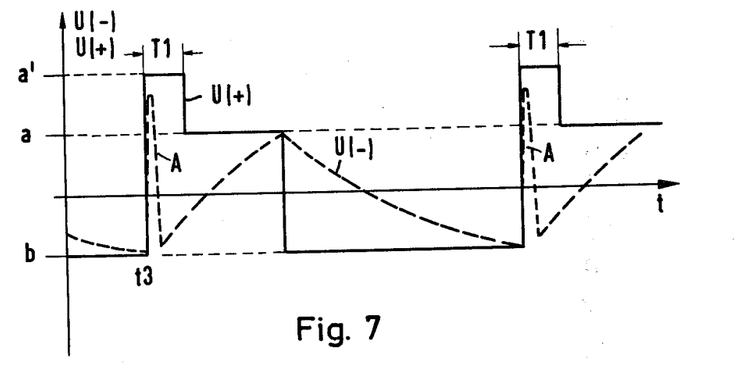
FIG. 7 is a graph showing the waveforms vs. time of the signals present at the inputs of the threshold hysteresis level detector shown in FIG. 6.

FIG. 7 shows the signals at the inputs of level detector 19. Dashed lines again indicate the signal U(−) at the inverting input and solid lines indicate the signal U(+) at the non-inverting input. The level detector 19 is again set to upper and lower thresholds which correspond to values of sampled motor currents designated a and b. At time t3, the control transistors 15 are switched on and the current peak A appears superimposed on the sampled motor current. The current peak A is greater than the threshold a. However, time delay stage 37 increases the upper threshold value from a to a' during the delay time of the time delay stage 37. The time delay T1 of the time delay stage 37 is selected to correspond to the pulse width of the current peaks A and is determined by the values of resistor 38 and capacitor 39. At the end of the delay time T1, the upper threshold a' again drops to a, the value set by resistor 30. Time delay stage 37 may comprise a one-shot or monostable multivibrator which may comprise a flip-flop circuit connected to resistor 38 and capacitor 39.

Figure 8:
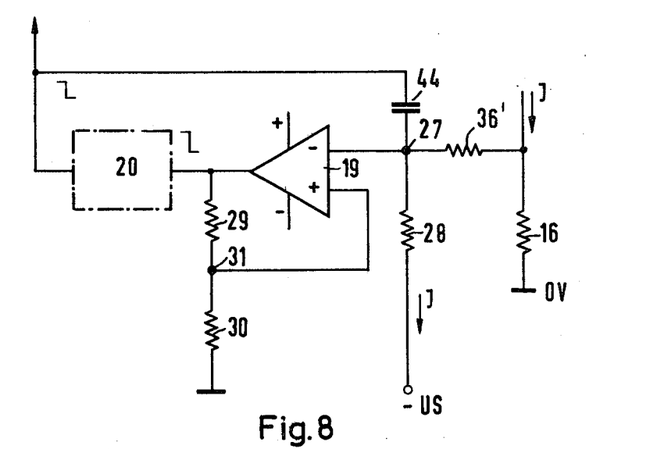
FIG. 8 is a schematic circuit diagram showing still another embodiment of means according to the invention for increasing the hysteresis of the threshold hysteresis level detector.

In FIG. 8 is shown another embodiment of the regulator circuit portion of the circuit shown in FIG. 1. The current supplied to the motor is sampled through resistor 16 and the sampled motor voltage is taken at point 21 and fed via resistor 36' to the comparison point 27 as in FIG. 6. According to the embodiment of the invention shown in FIG. 8, stable operation of the level detector 19 is achieved by adjusting the reference voltage at point 27 to compensate for the current peaks. This is achieved by connecting a capacitor 44 between the comparison point 27 at the inverting input of the level detector 19 and the output of the drive stage 20. In this way, the output of the drive stage 20 is fed back through capacitor 44 to reduce the reference voltage at point 27 sufficiently so that the current peaks A do not exceed the upper threshold value a. The effect of the current peaks is thus eliminated by feeding back the voltage change at the output of the drive stage 20 via the capacitor 44 to reduce the reference voltage at the inverting input of the level detector 19. The two threshold values a and b of the level detector 19 which provide the hysteresis, are set as described for FIG. 1.

Figure 9:
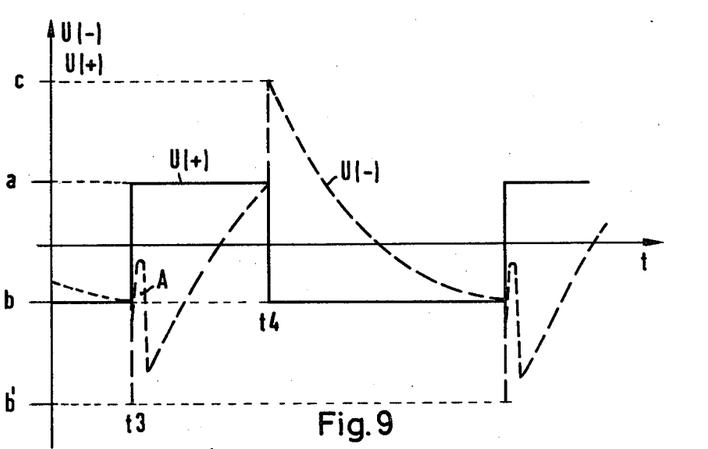
FIG. 9 is a graph showing the waveforms vs. time of the signals present at the inputs of the threshold hysteresis level detector shown in FIG. 8.

FIG. 9 shows the signals at the inputs of level detector 19, the signals at the inverting input again being shown by dashed lines U(−) and the signals at the non-inverting input by solid lines U(+). The two threshold values are again referenced a and b, and in this embodiment, the hysteresis remains constant. When control transistors 15 become conducting at time t3, the predetermined reference voltage is decreased to b' during current peaks A so that the peak magnitude of the current peaks A remain below the upper threshold a of the level detector 19. Transistors 15 then remain switched on until the upper threshold a is reached at time t4. The temporary increase of the sampled motor current up to c does not otherwise affect operation of the commutation device as this increase properly places the sampled motor current above the threshold a at time t4.

Figure 10:
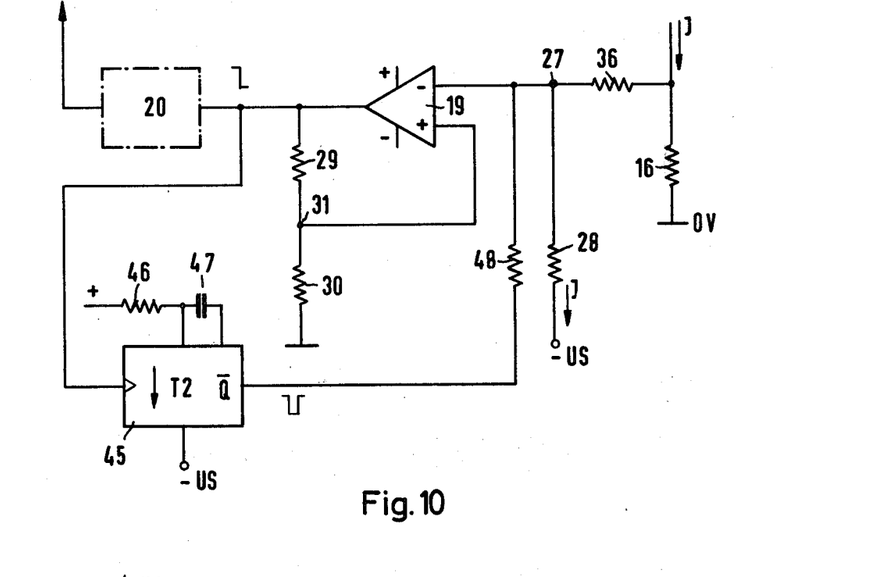
FIG. 10 is a schematic circuit diagram showing yet another embodiment of circuit means according to the invention for increasing the hysteresis of the threshold hysteresis level detector.

In FIG. 10 is shown still another embodiment of the regulator circuit portion of the circuit shown in FIG. 1. In this embodiment, as in the embodiment of FIGS. 8 and 9, compensation for the current peaks is achieved by reducing the reference voltage at point 27 during the current peaks. A time delay stage 45 is provided as in FIG. 6 and is triggered by the output of the level detector 19. The delay time is set similarly to that of time delay 37 by selecting the values of resistor 46 and capacitor 47. However, the time delay stage 45 does not temporarily increase the threshold voltage at point 31 to the level detector 19 as in FIG. 6, but the reference voltage at point 27 is temporarily reduced during the occurance of the undesired current peaks A so that the peak magnitude of the current peaks A are below the upper threshold value a of the level detector, as in FIGS. 8 and 9. With the arrangement shown in FIG. 10, this is achieved by connecting the complementary output $\overline{Q}$ of the time delay stage 45 to point 27 via resistor 48, so that additional current is fed back to point 27 which flows through resistor 28 to reduce the reference voltage during the delay time of the time delay stage 45. The output signal of the time delay stage 45 is limited in FIG. 10 to the value of the voltage source −US.

Figure 11:
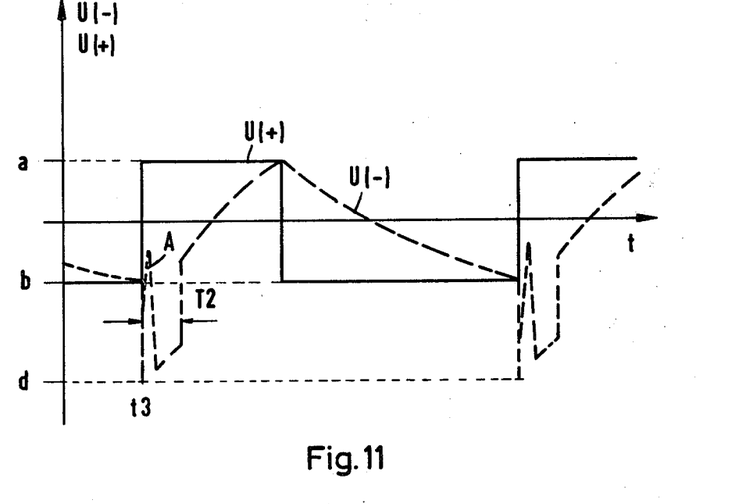
FIG. 11 is a graph showing the waveforms vs. time of the signals present at the inputs of the threshold hysteresis level detector shown in FIG. 10.

FIG. 11 shows the signals at the inputs of level detector 19 of FIG. 10 as a function of time; the dashed lines indicate the signals U(−) at the inverting input and the solid lines indicate the signals U(+) at the non-inverting input. At time t3, the signal at the inverting input is decreased for the delay time period T2 so that the peak magnitude of the current peaks A do not affect operation of level detector 19, i.e., the peaks remain below the threshold value a and the level detector operates stably.

The advantages of the present invention, as well as certain changes and modifications of the disclosed embodiments thereof, will be readily apparent to those skilled in the art. It is the applicant's intention to cover by their claims all those changes and modifications which could be made to the embodiments of the invention herein chosen for the purposes of the disclosure without departing from the spirit and scope of the invention.

What is claimed is:

1. In a commutation device for a brushless d-c motor including a commutation circuit connected to the motor windings, a regulator circuit for providing constant current from a power source to the windings through the commutation circuit, the regulator circuit including a main transistor control means connected between the commutation circuit and the power source for controlling current from the power source to the commutation circuit and a threshold hysteresis level detector the output of which is connected to the main transistor control means for controlling the main transistor control means, the improvement comprising means for increasing the threshold hysteresis of the level detector during the occurrence of current peaks generated by switching in the commutation circuit.

2. The improvement recited in claim 1, wherein the commutation circuit includes a transistorized bridge circuit connecting the main transistor control means to the stator windings of the motor as a function of the position of the rotor of the motor whereby current may be supplied to the windings in both directions, and wherein one input of the level detector is connected to a first circuit location providing a signal to the one input which is proportional to the current supplied to the windings and another input of the level detector is connected to a second circuit location providing a threshold signal to the other input.

3. The improvement recited in claim 2, wherein the means for increasing the threshold hysteresis comprises a differentiator connected between the output of the main transistor control means and the other input.

4. The improvement recited in claim 3, wherein the regulator circuit includes a drive stage connected between the output of the level detector and the main transistor control means, the main transistor control means comprising at least one transistor, the base of the transistor being connected to the output of the drive stage, the collector of the transistor being connected to the bridge circuit, and the emitter of the transistor being connected to the power source, and wherein the level detector has an inverting input and a non-inverting input, the first circuit location being connected to the inverting input and the second circuit location being connected to the non-inverting input, and wherein the differentiator comprises a resistor connected in series with a capacitor connected to the collector of the transistor and to the non-inverting input of the level detector.

5. The improvement recited in claim 2, wherein the means for increasing the threshold hysteresis comprises time delay means connected between the output of the level detector and one of the inputs of the level detector, the time delay means being operative to increase the threshold hysteresis during the time delay period of the time delay circuit.

6. The improvement recited in claim 5, wherein the regulator circuit includes a drive stage connected between the output of the level detector and the main transistor control means, the main transistor control means comprising at least one transistor, the base of the transistor being connected to the output of the drive stage, the collector of the transistor being connected to the bridge circuit, and the emitter of the transistor being connected to the power source, and wherein the level detector has an inverting input and a non-inverting input, the first circuit location being connected to the inverting input and the second circuit location connected to the non-inverting input, and wherein the time delay means includes an input connected to the output of the level detector for actuating the time delay means and an output connected to the non-inverting input of the level detector.

7. The improvement recited in claim 6, wherein the output of the time delay means is connected to the non-inverting input through a resistor and a diode.

8. The improvement recited in claim 5, wherein the regulator circuit includes a drive stage connected between the output of the level detector and the main transistor control means, the main transistor control means comprising at least one transistor, the base of the transistor being connected to the output of the drive stage, the collector of the transistor being connected to the bridge circuit, and the emitter of the transistor being connected to the power source, and wherein the level detector has an inverting input and a non-inverting input, the first circuit location being connected to the inverting input and the second circuit location being connected to the non-inverting input, and wherein the time delay means includes an input connected to the output of the level detector for actuating the time delay means and an output connected to the inverting input of the level detector.

9. The improvement recited in claim 8, wherein the output of the time delay means is a complimentary output thereof and is connected to the inverting input through a resistor.

10. The improvement recited in claim 2, wherein the regulator circuit includes a drive stage connected between the output of the level detector and the main transistor control means, the main transistor control means comprising at least one transistor, the base of the transistor being connected to the output of the drive stage, the collector of the transistor being connected to the bridge circuit and the emitter of the transistor being connected to the power source, and wherein the level detector has an inverting input and a non-inverting input, the first circuit location being connected to the inverting input and the second circuit location being connected to the non-inverting input, and wherein said means for increasing the threshold hysteresis comprises a capacitor connected between the output of the drive stage and the inverting input of the level detector.

11. The improvement recited in claim 2, wherein the means for increasing the hysteresis of the level detector is operative to change the threshold signal to the other input during the current peaks.

12. The improvement recited in claim 2, wherein the means for increasing the hysteresis of the level detector is operative to change the signal to the one input during the current peaks.

13. In a method for regulating current supplied to a brushless d-c motor in a commutation device in which current peaks are generated therein during commutation of the motor comprising feeding a first signal proportional to the motor current and a threshold signal to hysteresis level detection means, obtaining an output signal therefrom responsive to the relationship of the first signal and first and second level thresholds which are determined by the threshold signal, the first and second level thresholds determining the hysteresis of the level detection means, and feeding the output signal to transistor means for controlling the current supplied from a power source to commutation means, the improvement comprising the step of increasing the hysteresis of the level detection means during the current peaks.

14. The improvement recited in claim 13, wherein the step of increasing the hysteresis is accomplished by changing the threshold signal during the current peaks.

15. The improvement recited in claim 13, wherein the step of increasing the hysteresis is accomplished by changing the first signal during the current peaks.

16. The improvement recited in claim 14, wherein the threshold signal is changed by differentiating the current supplied to the commutation means and combining the differentiated current with the threshold signal to change the threshold signal during the current peaks.

17. The improvement recited in claim 14, wherein the threshold signal is changed by obtaining a signal of predetermined duration from time delay means triggered by the output signal and combining the signal of predetermined duration with the threshold signal to change the threshold signal during the current peaks.

18. The improvement recited in claim 15, wherein the threshold signal is changed by feeding back the output signal and combining the fedback output signal with the first signal through a capacitor to change the first signal during the current peaks.

19. The improvement recited in claim 15, wherein the threshold signal is changed by obtaining a signal of predetermined duration from time delay means triggered by the output signal and combining the signal of predetermined duration with the first signal to change the first signal during the current peaks.

* * * * *